United States Patent
Kabatzke et al.

(10) Patent No.: US 7,705,481 B2
(45) Date of Patent: Apr. 27, 2010

(54) WIND ENERGY PLANT WITH PITCH CONTROLLER

(75) Inventors: Wolfgang Kabatzke, Geesthacht (DE); Lars-Ulrich Wiese-Muller, Pinneberg (DE); Detlef Schluter, Lubeck (DE)

(73) Assignee: Nordex Energy GmbH, Norderstedt (DE)

( * ) Notice: Subject to any disclaimer, the term of this patent is extended or adjusted under 35 U.S.C. 154(b) by 206 days.

(21) Appl. No.: 12/104,093

(22) Filed: Apr. 16, 2008

(65) Prior Publication Data

US 2009/0212565 A1 Aug. 27, 2009

(30) Foreign Application Priority Data

Feb. 21, 2008 (DE) ................ 10 2008 010 466

(51) Int. Cl.
*F03D 9/00* (2006.01)
*H02P 9/00* (2006.01)

(52) U.S. Cl. ........................................ 290/44
(58) Field of Classification Search .................... 290/44
See application file for complete search history.

(56) References Cited

U.S. PATENT DOCUMENTS

| | | | |
|---|---|---|---|
| 4,160,170 A * | 7/1979 | Harner et al. ................. | 290/44 |
| 4,161,658 A * | 7/1979 | Patrick ......................... | 290/44 |
| 4,189,648 A * | 2/1980 | Harner ......................... | 290/44 |
| 4,193,005 A | 3/1980 | Kos et al. | |
| 4,695,736 A * | 9/1987 | Doman et al. ................. | 290/44 |
| 4,700,081 A * | 10/1987 | Kos et al. ..................... | 290/44 |
| 7,417,332 B2 * | 8/2008 | Malakhova et al. ........... | 290/44 |
| 2009/0079195 A1 * | 3/2009 | Ito et al. ....................... | 290/44 |
| 2009/0142192 A1 * | 6/2009 | LeClair et al. ................. | 416/9 |
| 2009/0212566 A1 * | 8/2009 | Harms et al. .................. | 290/44 |

FOREIGN PATENT DOCUMENTS

| | | | |
|---|---|---|---|
| JP | 62185600 A | * | 8/1987 |
| JP | 08312522 A | * | 11/1996 |

* cited by examiner

*Primary Examiner*—Joseph Waks
(74) *Attorney, Agent, or Firm*—Vidas, Arrett & Steinkraus, P.A.

(57) ABSTRACT

A wind energy plant having at least one rotor blade with a pitch angle, the pitch angle being adjustable by means of a pitch controller, and a generator converter unit, at least one electrical quantity of the generator converter unit being adjustable by means of a converter controller, wherein the wind energy plant has a power train with a rotor having the at least one rotor blade, the rotor being disposed at a front end of the power train and the power train leading to the generator converter unit, wherein a first rotation speed detection unit is provided at the power train near the front end of the power train and a second rotation speed detection unit is provided at the power train near the generator converter unit, wherein the measured rotation speed $n_{rot}$ of the first rotation speed detection unit is applied as an input variable to the pitch controller and the measured rotation speed of the second rotation speed detection unit is applied as an input variable to the converter controller.

11 Claims, 2 Drawing Sheets

WIND ENERGY PLANT WITH PITCH CONTROLLER

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a wind energy plant having at least one rotor blade with a pitch angle, the pitch angle being adjustable by means of a pitch controller. Further, the wind energy plant has a generator converter unit, at least one electrical quantity of the generator converter unit being adjustable by means of a converter controller. The wind energy plant has a power train beginning with a rotor carrying the at least one rotor blade. The power train continues with a rotor shaft connected to the rotor. The rotor shaft is coupled to a gear, the output shaft of the gear leads into the generator.

The technical term pitch angle of a rotor blade is also called "blade angle", so that the pitch controller may also be called "blade angle controller".

The power output of the wind energy plant in the rated power range is mainly controlled by means of the rotation speed set point. In this case, the regulation is performed by a converter controller, sometimes also being called main converter controller. The regulation approach currently used in wind energy plants takes into account the rotation speed of the generator as a signal source for the converter controller. The precision of the rotation speed of the generator is highly dependent on different influencing factors, because the measured rotation speed of the generator as a rule interferes with oscillations of the power train, resiliences of the gear, oscillations of the machine carrier and tolerances in a clutch means, if provided. Up to now, in order to suppress theses influencing factors in the rotation speed of the generator, a strong filtering and damping of the measured values was performed. In particular, the measured values of the rotation speed of the generator were smoothed and in certain frequency bands partly eliminated. In the past, the so-filtered values of the rotation speed of the generator were applied also to a pitch controller, in order to adjust the pitch angle in dependency on the rotation speed of the generator. In particular in wind energy plants with large rotor diameter, the filtered values of the rotation speed of the generator led to a slow, sluggish behaviour of the pitch angle regulation.

The invention is based on the technical problem to provide a wind energy plant with a regulation of the pitch angle allowing for a dynamic regulation of the pitch angle, without interfering with the regulation of the converter more often than necessary.

BRIEF SUMMARY OF THE INVENTION

The wind energy plant of the invention has at least one rotor blade with a pitch angle, the pitch angle being adjustable by means of a pitch controller. Further, the wind energy plant of the invention is provided with a generator converter unit, wherein at least one electrical quantity generated is adjustable by means of a converter controller. The generator-converter unit is not necessarily build up as a constructive or structural unit, but denominates generator and converter working together in order to provide the desired electrical quantity. The wind energy plant is further provided with a power train, wherein at the front end of the power train, there is disposed a rotor with the at least one rotor blade, and the other end of the power train leads to the generator converter unit. That is, the power train runs from the rotor to the generator.

According to the invention, the wind energy plant is provided with two rotation speed detection units at the power train. A first rotation speed detection unit is provided near the front end of the power train. The second rotation speed detection unit is provided at the power train near the generator converter unit. In the wind energy plant according to the invention, the measured rotation speed of the first rotation speed detection unit is applied as an input variable to the pitch controller and the measured rotation speed of the second rotation speed detection unit is applied as an input variable to the converter controller. The controllers determine the pitch angle and perform the regulation of the converter, respectively, dependent on the measured input values of the rotation speeds and the further input variables necessary for the regulation. In the wind energy plant design of the invention, the first rotation speed detection unit detects the rotation speed at the power train or at the rotor shaft thereof, respectively, largely independent of disturbing influences and oscillations in the power train, so that the measured rotation speed signals are available largely without disturbances. The second rotation speed detection unit at the power train near the generator converter unit detects a value for the generator rotation speed that indicates the rotation speed at the generator and can be used for controlling the converter by means of the converter controller.

In a preferred aspect of the wind energy plant of the invention, the first rotation speed detection unit, preferably a high-resolution rotation speed detection unit, is disposed at the front end of the power train. Preferably, the rotation speed of the rotor shaft is measured by the first rotation speed detection unit optically, wherein a resolution of more than 2,000 pulses per revolution is used. In this preferred aspect, the first rotation speed detection unit is a high resolution, optical pulse counter disposed at the front end of the power train. Usage of such a high resolution, optical pulse counter allows to detect the rotation speed of the rotor shaft in the region of the rotor very precisely.

The second rotation speed detection unit is preferably disposed between an output shaft of a gear and an input shaft of the generator, or directly at the generator. Advantageously, the measured rotation speed of the second rotation speed detection unit is filtered for the generator controller by a signal processing means, for example to remove perturbations from the measured values of the generator rotation speed. By means of the signal processing means, preferably, there is performed a smoothing of the measured rotation speed values, wherein it may also be provided to filter out predetermined frequencies of power train oscillations from the measured rotation speed values.

Preferably, there is provided an additional rotation speed monitoring unit at the wind energy plant which compares the measured rotation speed values to each other and, if a deviation is detected, issues a control signal indicating failure in the power train. The rotation speed monitoring unit performs a plausibility check of the two measured rotation speed values, wherein as a matter of course the transmission ratio of the gear is taken into account when comparing the rotation speed values. The rotation speed monitoring unit allows to detect a gear fault or a defect in the clutch. In the rotation speed monitoring unit, the measured rotation speed values are compared, taking into account the transmission ratio of the gear.

In an especially preferred aspect, in addition, the output signal of the second rotation speed detection unit is also applied to the pitch controller. This signal input to the pitch controller allows to perform a regulation of the pitch angle, in addition or as an alternative, dependent on the measured rotation speed values of the second rotation speed detection unit. Preferably, for predetermined operating conditions, the pitch controller regulates the pitch angle exclusively based on measured values of the second rotation speed detection unit. In a further aspect of the invention, the pitch controller reverts to measured values of the first rotation speed detection unit in order to regulate the pitch angle, when the measured rotation speed of the first or second rotation speed detection unit has gone beyond a predetermined threshold. With reference to the operating conditions of the wind energy plant, the rotation speed-dependent switching at the pitch controller means that starting from a certain minimum rotation speed of the rotor shaft, the regulation of the pitch angle is performed depending on rotation speed values measured at the first rotation speed detection unit.

BRIEF DESCRIPTION OF THE SEVERAL VIEWS OF THE DRAWINGS

In the following, the wind energy plant of the invention is explained in greater detail on the basis of two figures.

DETAILED DESCRIPTION OF THE INVENTION

Figure 1:
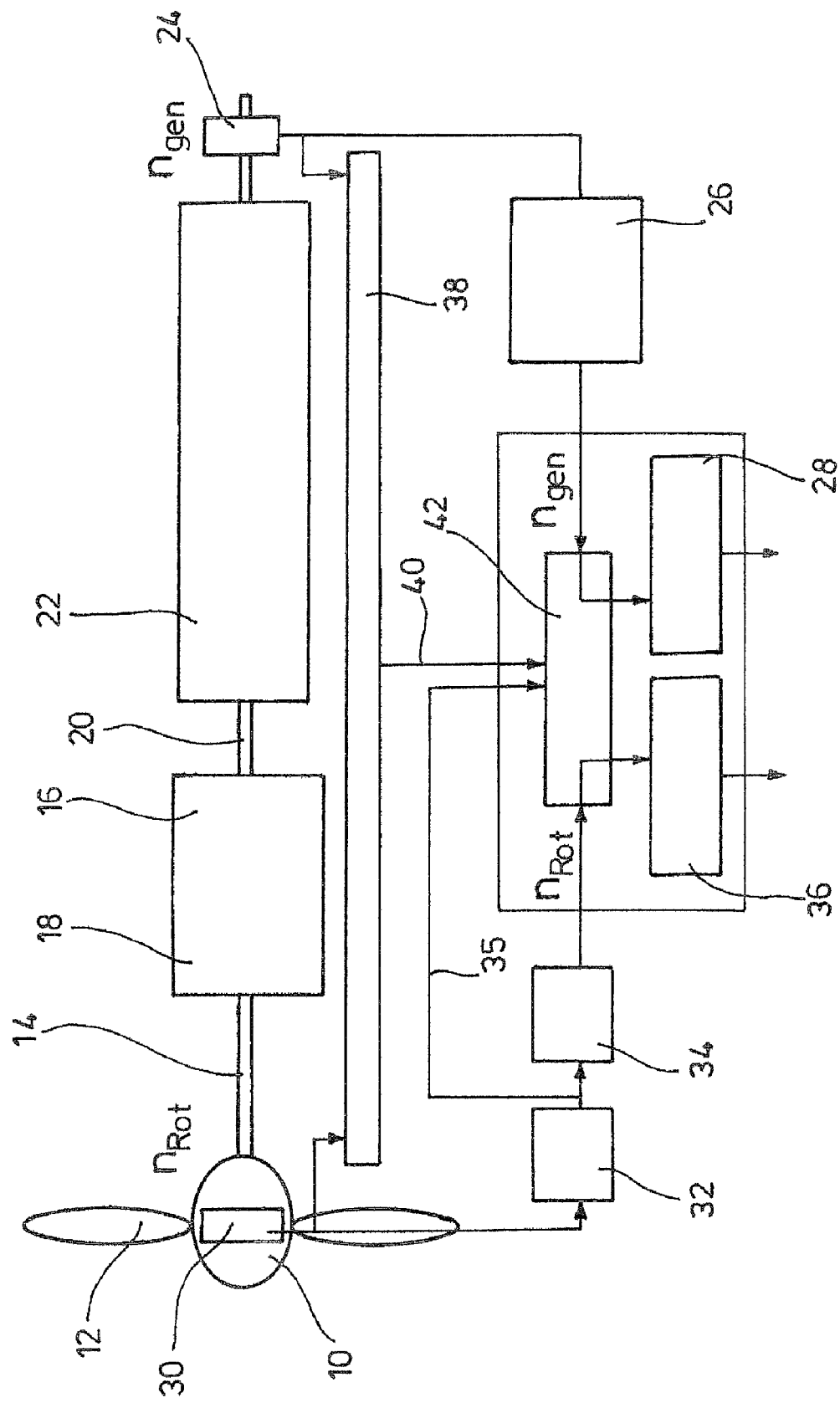
FIG. 1 shows the schematic design of the power train with two rotation speed detection units.

While this invention may be embodied in many different forms, there are described in detail herein a specific preferred embodiment of the invention. This description is an exemplification of the principles of the invention and is not intended to limit the invention to the particular embodiment illustrated FIG. 1 shows the power train of a wind energy plant with a rotor 10 and two rotor blades 12 in a schematic view. A rotor shaft 14 with a clutch 16 and a gear 18 is connected to the rotor 10. The gear has a transmission ratio, by means of which the rotation speed of the rotor shaft is increased. The output shaft 20 of the gear 18 leads to a generator 22. In the following, the shaft 20 is called generator shaft 20 or fast shaft.

An incremental encoder 24 is disposed at the generator 22, detecting the rotation speed of the generator shaft 20 or a shaft in the generator 22. Through a signal processing means 26, the output of the incremental encoder 24 is transmitted to the main converter controller 28. By means of the converter controller 28, a regulation of the converter and, as the case may be, also of the generator, is performed. What is regulated is the active power of the generator controller unit fed into the grid.

The incremental encoder 30 disposed at the front end of the rotor shaft 14 in the rotor 10 is also shown in FIG. 1. The incremental encoder is a high resolution incremental encoder which can optically detect 14 bit per revolution, preferably even 16 bit per revolution. The measured rotation speed of the incremental encoder 20 is transferred to pitch controller 36 through a pulse converter 32 and an analysis device 34 as $n_{rot}$. The pitch controller 36 generates the respective signal for adjustment of the pitch angle $\phi$ ($n_{rot}$, . . . ). If no analysis device 34 shall be used for $n_{rot}$, the rotor rotation speed $n_{rot}$ can also be applied directly to the control unit 42 through channel 35.

In addition, FIG. 1 depicts a rotation speed monitoring unit 38, to which the measured rotor rotation speed 30 and the measured generator rotation speed 24 are applied. The rotation speed monitoring unit 38 compares the two rotation speed values, taking into account the transmission ratio at the gear 18, and, if deviations are detected, sends an error signal to control unit 42 through connection 40. The control unit 42 can for example trigger a shutdown of the wind energy plant in response to the error signal indicating that the measured rotation speed values do not reflect the correct ratio to each other.

Figure 2:
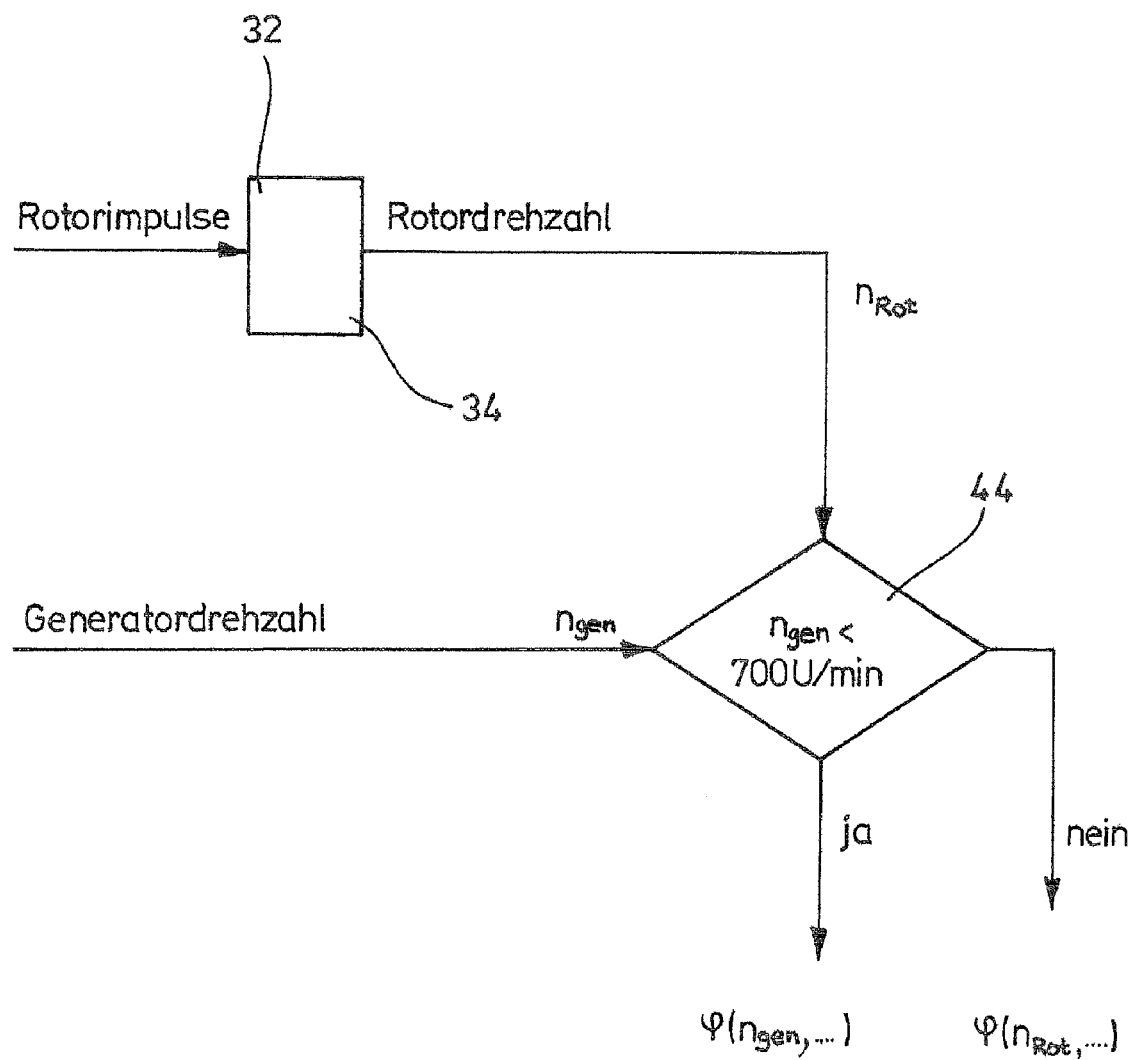
FIG. 2 shows a flow diagram for switching between the measured rotation speed values.
Figure 2:
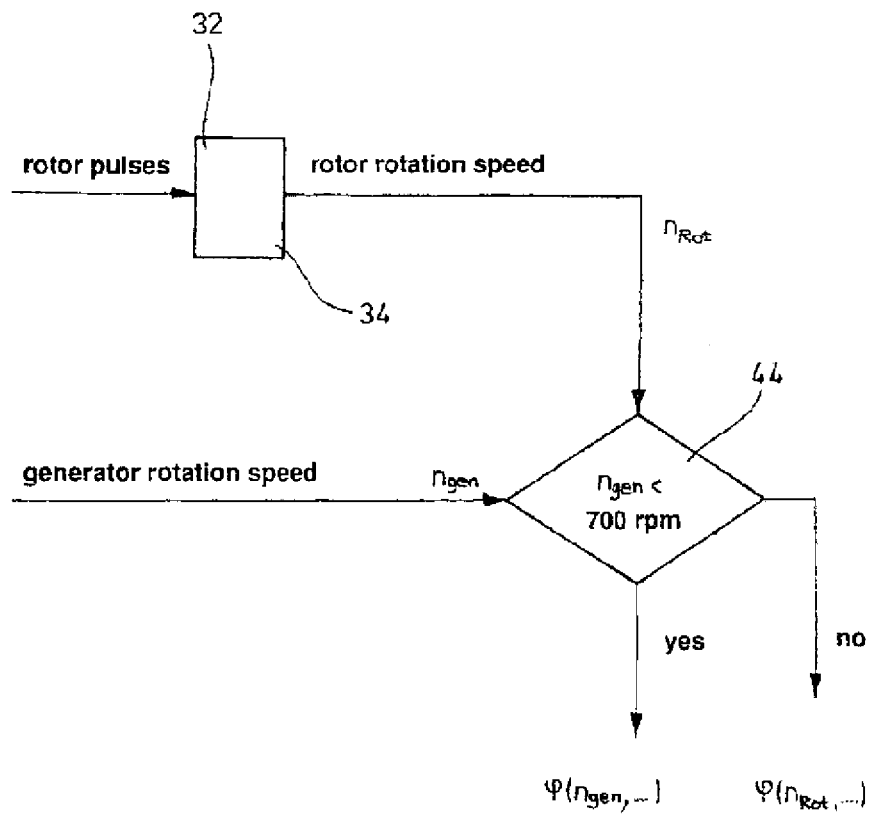

When operating the wind energy plant, the control unit 42 also fulfills another task. The control unit 42 checks if the measured rotor rotation speed of the incremental encoder 30 should already be applied to the controller 36. To this end, as shown in FIG. 2, the control unit 42 checks if the generator rotation speed detected at the incremental encoder 24 is below a predetermined threshold. As an example of such a threshold, FIG. 2 shows a threshold of 700 rpm. Depending on construction and type of the wind energy plant, other values can also be used as thresholds for the generator rotation speed. In a first measurement, it has turned out to be an advantage to choose a threshold for the generator rotation speed such that the wind energy plant produces about two thirds of its rated power when reaching the threshold.

If the generator rotation speed $n_{gen}$ is smaller than the predetermined threshold of 700 rpm, the generator rotation speed is applied as an input variable to the pitch controller, $\phi$ ($n_{gen}$, . . . ). If the generator rotation speed $n_{gen}$ is equal to or greater than the predetermined value of 700 rpm, the pitch controller is working dependent on the measured rotor rotation speed, $\phi$ ($n_{rot}$, . . . ). In FIG. 2, the respective dependency of the pitch controller is illustrated by means of the pitch angle $\phi$ in dependence on $n_{rot}$ or $n_{gen}$, respectively. Herein, obviously, the current transmission ratio of the gear is to be taken into account. The corresponding query 44 is carried out in the control unit 42.

When operating the wind energy plant, at first a pitch regulation is performed in a manner known as such, wherein the pitch regulation is carried out in dependence on the measured and correspondingly filtered generator rotation speed. When a certain minimum rotation speed at the generator shaft 20 is exceeded, the rotor shaft 14 rotates fast enough to reliably determine the rotation speed values at the rotor shaft 14 with the incremental encoder 30. In this case, the control unit 42 switches over and a pitch regulation is performed in dependence on the measured rotation speed of the rotor shaft, measured by the incremental encoder 30, which is largely free of oscillations in the power train. The incremental encoders 24 and 30 are high resolution incremental encoders in order to allow a precise measurement of the rotation speed.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind energy plant having at least one rotor blade with a pitch angle, the pitch angle being adjustable by means of a pitch controller, and a generator converter unit, at least one electrical quantity of the generator converter unit being adjustable by means of a converter controller, wherein the wind energy plant has a power train with a rotor having the at least one rotor blade, the rotor being disposed at a front end of the power train and the power train leading to the generator converter unit, characterized in that a first rotation speed detection unit (30) is provided at the power train near the front end of the power train and a second rotation speed detection unit (24) is provided at the power train near the generator converter unit (22), wherein the measured rotation speed ($n_{rot}$) of the first rotation speed detection unit (30) is applied as an input variable to the pitch controller (36) and the measured rotation speed of the second rotation speed detection unit (24) is applied as an input variable to the converter controller (28).

2. A wind energy plant according to claim 1, characterized in that the first rotation speed detection unit (30) is disposed at the front end of the power train.

3. A wind energy plant according to claim 1, characterized in that the first rotation speed detection unit (30) measures the rotation speed $n_{rot}$ of the rotor shaft (14) optically.

4. A wind energy plant according to claim 1, characterized in that the first rotation speed detection unit has a resolution of more than 2,000 pulses per revolution.

5. A wind energy plant according to claim 1, characterized in that the second rotation speed detection unit (24) is disposed between an output shaft of a gear (18) and an input shaft of the generator (22) or at the generator (22).

6. A wind energy plant according to claim 5, characterized in that the measured rotation speed of the second rotation speed detection unit for the converter controller (28) is filtered by a signal processing means (26).

7. A wind energy plant according to claim 6, characterized in that the signal processing means (26) smoothes the measured rotation speed values.

8. A wind energy plant according to claim 1, characterized in that an additional rotation speed monitoring unit (38) is provided which compares the measured rotation speed values ($n_{rot}$, $n_{gen}$) to each other and, if a deviation is detected, issues an error signal (40) indicating an error in the power train.

9. A wind energy plant according to claim 1, characterized in that in addition, the output signals of the second rotation speed detection unit are applied to the pitch controller.

10. A wind energy plant according to claim 9, characterized in that for predetermined operating conditions of the wind energy plant, the pitch controller controls the pitch angle by means of measured values of the second rotation speed detection unit only.

11. A wind energy plant according to claim 1, characterized in that the pitch controller reverts to measured values of the first rotation speed detection unit when the measured rotation speed of the first or second rotation speed detection unit exceeds a predetermined threshold.

\* \* \* \* \*

UNITED STATES PATENT AND TRADEMARK OFFICE
CERTIFICATE OF CORRECTION

PATENT NO. : 7,705,481 B2  Page 1 of 2
APPLICATION NO. : 12/104093
DATED : April 27, 2010
INVENTOR(S) : Kabatzke et al.

It is certified that error appears in the above-identified patent and that said Letters Patent is hereby corrected as shown below:

Delete fig. 2 and substitute therefor the drawing sheet, consisting of fig. 2 as shown on the attached page.

Signed and Sealed this
First Day of May, 2012

David J. Kappos
*Director of the United States Patent and Trademark Office*